United States Patent [19]

Serp

[11] 4,292,624
[45] Sep. 29, 1981

[54] INTERNATIONAL MORSE CODE NUMBER GENERATOR

[76] Inventor: William K. Serp, 4027 Harvey Ave., Western Springs, Ill. 60558

[21] Appl. No.: 517,813

[22] Filed: Oct. 25, 1974

[51] Int. Cl.³ .............................................. H04L 3/04
[52] U.S. Cl. ................................ 340/347 DD; 178/79
[58] Field of Search .................. 235/154, 92 EA, 156; 340/347 DD, 348, 365 S, 172.5, 324 R; 178/26, 79

[56] References Cited

U.S. PATENT DOCUMENTS

| | | | |
|---|---|---|---|
| 2,940,669 | 6/1960 | Hobbs | 340/365 S X |
| 3,185,825 | 5/1965 | McDonald | 340/347 DD |
| 3,261,913 | 7/1966 | Reichert | 178/26 |
| 3,496,294 | 2/1970 | Emanuels | 178/79 |
| 3,496,563 | 2/1970 | Staples et al. | 340/348 |
| 3,725,906 | 4/1973 | Quick | 340/365 S X |
| 3,749,896 | 7/1973 | Munt | 340/324 R |
| 3,772,659 | 11/1973 | Vries | 340/172.5 |
| 3,820,107 | 6/1974 | Niizawa | 235/92 EA |
| 3,824,559 | 7/1974 | Grundy | 340/172.5 |
| 3,892,957 | 7/1975 | Bryant | 235/156 |

Primary Examiner—Charles D. Miller
Attorney, Agent, or Firm—William K. Serp

[57] ABSTRACT

The binary coded decimal of a number is selectively loaded into presettable counters. A switching means sequentially connects each of the binary levels of each of the digits comprising the number to an International Morse Code memory addressing a selected segment thereof. A binary counter sequentially addresses each of the bit locations of the selected memory segment thereby serially generating, in Internatonal Morse Code, the digit contained in the addressed memory segment. Upon completion of the code translation of a selected digit of the number, the switching means connects the binary levels of the counter containing the next lesser significant digit to the memory address and the binary counter is recycled. Means are included for selectively deleting the generation of leading zeros of the number and for selectively abbreviating the International Morse Code generation of certain digits comprising the number.

17 Claims, 4 Drawing Figures

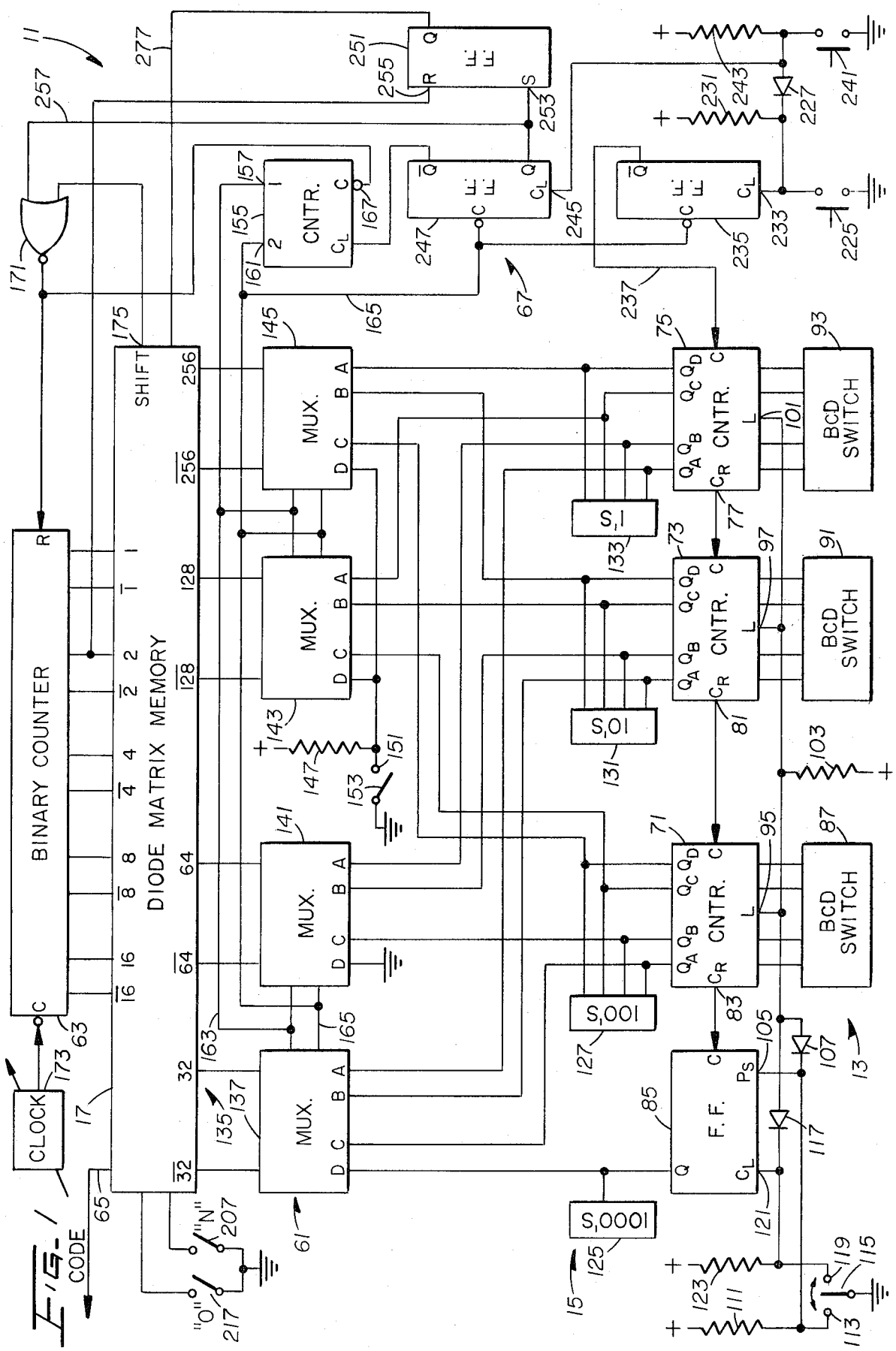

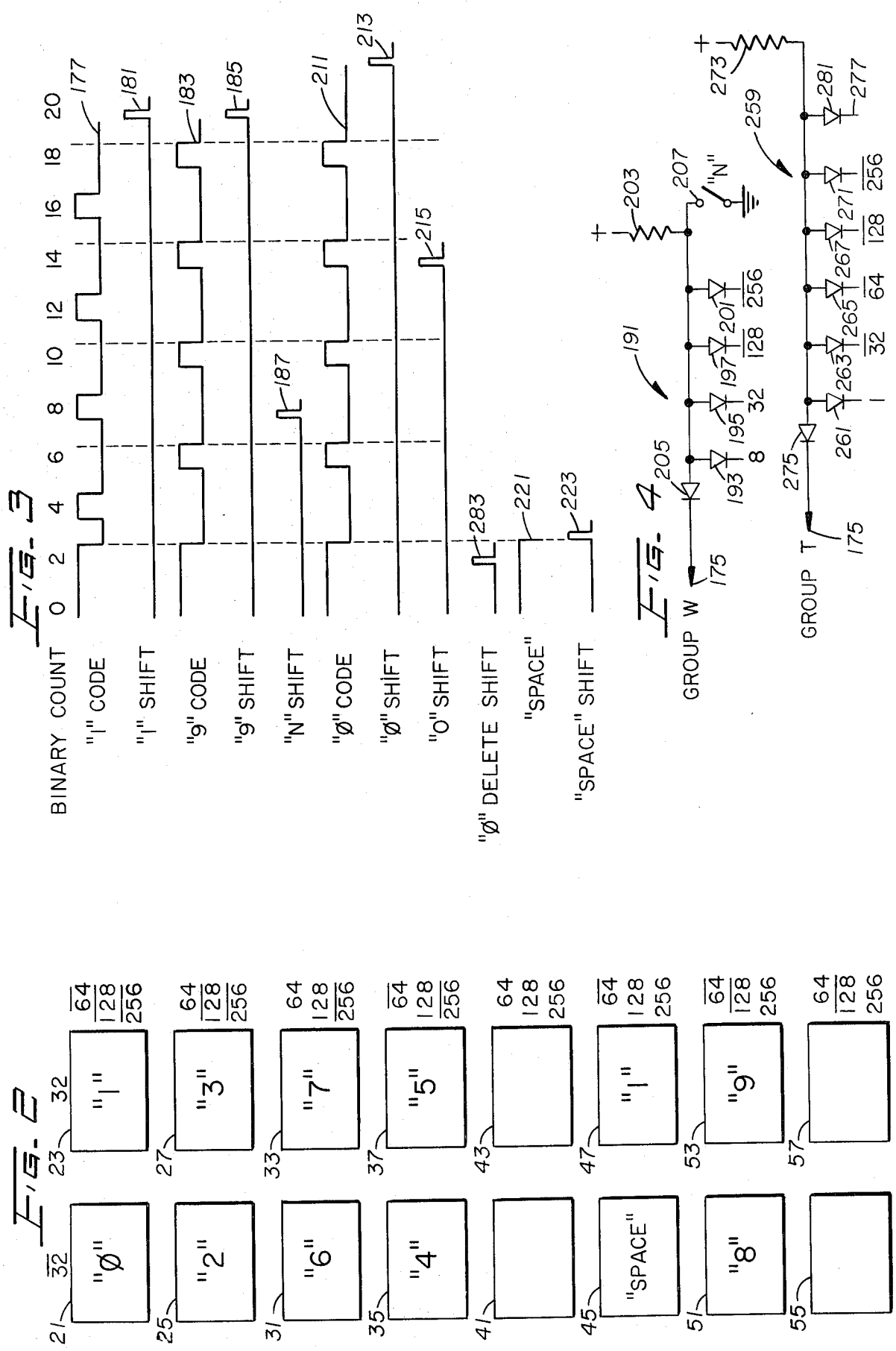

INTERNATIONAL MORSE CODE NUMBER GENERATOR

BACKGROUND OF THE INVENTION

This invention generally relates to an automatic International Morse Code generator providing a predetermined numerical message, and more particularly relates to such a device which generates a selectively actuable, progressive number.

Although the following description pertains to an apparatus for generating preselected numbers in International Morse Code, it will be appreciated that certain of the features described and claimed herein may be utilized for the generation of numbers in other codes such as ASCII, Baudot or American Morse Code. The term Morse code as used hereinafter shall refer to the International Morse Code. Frequently, a Morse code operator, either in amateur or commercial practice, desires to send a progressive number with each message transmitted. In amateur practice, many operating exercises include, as part of the message format, a progressively increasing number indicating the numerical position of the message being sent with respect to others sent by the same operator. A recent survey by applicant indicates that in over sixty activities sponsored by American and foreign amateur radio organizations over fifty of them, or eighty percent, included a number in the message format. The manual transmission of such a number is exceptionally burdensome since an experienced operator may easily exceed a thousand individual message transmissions in a twenty-four hour period. As the operator's fatigue rises over long operating periods, the possibility of transmission errors increases requiring correction and thus repeated transmissions. Certain portions of a message are generally fixed such as the operator's geographical location and Morse code generators are presently available which automatically send a predetermined fixed format in response to a single manual actuation, with the digits comprising the number being individually, manually generated. Thus, it would decrease operator fatigue and eliminate a potential source of transmission error if the operator were provided with a convenient means for generating progressively increasing numbers in response to a single manual response such as the momentary depression of an appropriate switch.

Before preceding with a detailed discussion of the illustrated embodiment, the following comments, with respect to the composition of an International Morse Code number, may provide the reader with a greater appreciation for the features of this invention. A Morse encoded number is composed of a sequence of Morse code digits sent in sequence. The number may have three significant digits. In this instance, the number one would be preceded by the code transmission of two leading zeros (001), and correspondingly the number thirty-five (035) preceded by a single transmitted zero and, of course, numbers greater than ninety-nine would start with the code transmission of a whole integer. Hereinafter, such a number is referred to as a "leading zero number". Alternatively, the number generated may commence with the first digit always being a nonzero digit with all significant zeros in the preselected number preceding the non-zero digit being deleted. That is, if the preselected number is "001" only the Morse code digit one would be transmitted, the generation of the first two significant digits of the preselected number would be deleted. Such a number generation is referred to hereinafter as a "plain number".

A digit ($\phi$ through 9) in Morse code is composed of the generation of a combination of unique dots and dashes. A dot being one third the time length of a dash and each of the dots and dashes comprising a selected digit being separated by a time interval equivalent to the length of a dot. That is, a dot is one bit length, a dash three bits and the separation of dots and dashes comprising a digit is one bit. Each of the digits comprising a number are separated by a time interval or inter-digit space equivalent to the time length of a dash which is three times the length of a dot. For example, the number one consists of a dot followed by four dashes, for a total bit length of seventeen. The number four consists of four dots followed by a single dash for a total bit length of eleven and the number fourteen is thirty-one bits long $(17+11+3)$. Thus, each of the ten Morse code digits have a unique bit length introducing certain character generation problems which are not encountered in the generation of numbers in other codes such as ASCII or Baudot which have fixed bit lengths.

The digits nine (9) and zero ($\phi$) are the longest of the ten International Morse Code digits. Digit nine (9) being four dashes followed by a single dot (seventeen bits) and digit zero ($\phi$) being five dashes (nineteen bits). Due to the relatively long time duration required to generate these digits, it has developed as an accepted practice for operators, at their discretion, to abbreviate a zero by sending the letter "O" which is three dashes long (11 bits) and the numeral nine as the letter "N" which consists of a dash followed by a dot (5 bits). The use of an abbreviated zero (letter O) is especially encountered when the number being generated is of the leading zero type; the leading zeros being sent as the letter "O". Thus, it is particularly convenient, in connection with the generation of a number whether plain or with leading zeros, to provide the operator with a convenient means of selecting either conventional or abbreviated forms of the digits zero and nine.

SUMMARY

An apparatus is described for generating an encoded preselected number having a plurality of significant digits. Means are included for serially generating an encoded most significant digit of the number and subsequently serially generating encoded progressively lesser significant digits of the number. The serial generating means includes a selectively addressable memory having a plurality of exclusively addressable segments containing an encoded digit with each of the segments having a plurality of individually addressable bit locations. Additionally, means are provided for sequentially addressing those memory segments which correspond to the digits of the number thereby translating the preselected number into a serially generated code.

The apparatus additionally includes means for deleting the generation of encoded leading zero digits preceding the most significant non-zero digit in the number so that the code generation commences with a digit greater than zero. Further, selectively operable means are included for abbreviating the code equivalent of the digit contained in at least one of said memory segments so that the segment will generate an abbreviated digit when addressed.

It is a main object of this invention to provide an improved code number generator including means for selectively modifying the code configuration of the number being generated. Other objects, advantages and features of the invention will be more readily appreciated after reference to the following description and accompanying drawings.

DESCRIPTION OF THE DRAWINGS

FIG. 1 is a schematic block diagram of an apparatus including certain features of this invention;

FIG. 2 is a diagrammatic illustration of the organization of a component of the apparatus of FIG. 1;

FIG. 3 is a diagram illustrating operational modes of certain of the components of the apparatus of FIG. 1; and FIG. 4 is a schematic diagram of certain portions of a component illustrated in FIG. 1.

DETAILED DESCRIPTION

General

To prevent the reader from confusing the binary levels and the numerals "φ" through "9" mentioned in the following description and illustrated in the accompanying drawings with the components of the illustrated embodiment, the components of the embodiment have been designated with odd numbers above ten. With particular reference to FIG. 1, a number generator 11 is illustrated including a number selection and storage unit 13 which serves to determine the particular number to be generated. Additionally, a display 15 driven by the unit 13, is included which provides the user with a visual presentation of the number being generated. The serial generator 11 additionally includes a pre-programmed read-only memory 17 which, in the illustrated embodiment, is in the form of a diode matrix; however, it will be appreciated that other forms of read-only memories may be utilized without departing from the spirit of this invention. As will be subsequently further considered, the memory 17 is divided into a plurality of segments 21, 23, 25, 27, 31, 33, 35, 37, 41, 43, 45, 47, 51, 53, 55 and 57 (FIG. 2) certain of which contain a single encoded digit. Serving to permit sequential selection of those memory segments corresponding to the digits of the number determined by the selection and storage unit 13 is a switching means 61 each position of which corresponds to a significant digit of the preselected number. The switching means 61 sequentially selects each of the significant digits of the number as determined by the selection and storage unit 13 and addresses the appropriate memory 17 segment.

Serving to address each bit location in the selected memory 17 segment is a binary counter 63. As the binary equivalent of each significant digit comprising the selected number in the unit 13 is switched to address a particular memory segment, the binary counter 63 sequentially addresses each bit in the selected segment the level of which is serially read from a code output of the memory via line 65. Upon generation of the Morse code equivalent of a digit the switching means 61 sequentially advances to the next lesser significant digit of the selected number in the unit 13 until all of the digits comprising the preselected number have been translated into Morse code. The illustrated apparatus additionally includes control means 67 for selectively advancing the number selection and storage unit 13 so that the operator may continue to generate progressively increasing numbers. Additionally, the control means 67 includes means for selectively deleting the transmission of leading zeros in the number as will be subsequently considered.

NUMBER SELECTION AND STORAGE UNIT

The number selection and storage unit 13 includes three presettable binary coded decimal (BCD) counters 71, 73 and 75. Each of the counters 71, 73 and 75 relates to one of the lower three significant digits of the number to be generated. The counter 75 determines the least significant or "1's" digit of the number and a carry output 77 thereof is fed to a clock input of the "10's" digit counter 73. In turn a carry output 81 of the "10's" digit counter 73 is fed to the clock input of the "100's" digit counter 71. A carry output 83 of the 100's digit counter 71 is fed to the clock input of a half digit "100's" flip-flop 85 which stores the most significant digit of the selected number or the "1000'" digit. Thus, in the illustrated embodiment any number from zero to "1999" may be selected by the number selection and storage unit 13. It will be appreciated that the number of counters comprising the unit 13 may be varied to accommodate specific applications without departing from the spirit of the invention. As previously mentioned the three counters 71, 73 and 75 are presettable and the respective preset inputs thereof are connected to BCD switches 87, 91 and 93, respectively. The user sets the BCD switch 93 to the desired 1's digit, the switch 91 to the 10's digit and the switch 87 to the 100's digit of the number selected. The BCD switch settings are loaded into the counters 71, 73 and 75 in response to a signal applied to their respective load inputs 95, 97 and 101. The load inputs of the counters are commonly connected to a pull-up resistor 103, the remaining terminal of which is terminated to the positive supply source.

Coupling the load inputs 95, 97 and 101 of the counters 71, 73 and 75 to a preset input 105 of the 1000's digit flip-flop 85 is a steering diode 107. The preset input 105 of the flip-flop 85 is connected to one terminal of a pull-up resistor 111 and to a fixed contact 113 of a normally open, spring biased, single pole double throw switch 115. The movable terminal of the switch 115 is terminated to the common supply source. In response to momentary actuation of the switch to the left, as viewed in FIG. 1, the counters 71, 73 and 75 are loaded with the BCD switch settings and the flip-flop output Q goes high which is the digit "1" condition of the flip-flop 85. Similarly, the load inputs 95, 97 and 101 of the counters 71, 73 and 75 are connected through a second steering diode 117 to the clear input 121 of the thousands flip-flop 85. The clear input 121 is connected to one of a pull-up resistor 123 and to a remaining fixed terminal 119 of the switch 115. The user sets the BCD switches 87, 91 and 93 to the three lowest significant digits of the number selected. If the number to be loaded into the generator 11 is below "1000", the switch 113 is momentarily depressed to the right (FIG. 1) and the counters 95, 97 and 101 are loaded with the settings of the switches 87, 91 and 93 and the thousands flip-flop 85 output Q goes low indicating a stored "φ" digit.

DISPLAY

Serving to provide a visual display of the number stored in the selection unit 13 is the display unit 15 which includes four numerical displays 125, 127, 131 and 133. The displays may be in the form of light emitting diodes (LED's) fed through suitable binary to seven segment decoders or other available displays well known to those skilled in the art may be used. The display 133 is designated as the units display and is driven by the binary output of the 1's counter 75. Correspondingly, displays 131 and 127 are respectively designated 10's and 100's digit displays and driven by the 10's and 100's counters 73 and 71. The thousands display 125 is a half digit display and driven by the thousands flip-flop 85.

SWITCHING MEANS

As previously mentioned, the binary outputs of each of the presettable BCD counters 71, 73 and 75 as well as the output of the thousands digit flip-flop 85 are sequentially presented to the segment address inputs 135 of the memory 17. The switching means 61 initially presents the binary output of the thousands digit flip-flop 85 to the memory 17 and progressively switches to the output of the least significant or one's digit counter 75. As illustrated, the segment address inputs 135 of the memory 17 are four in number and designated by the binary levels "32", "64", "128", and "256" with the complements being provided. Thus, the memory may be visualized as having sixteen thirty-two bit segments (512 bits total). The switching means includes four, four to one (with complement) multiplexers 137, 141, 143 and 145 each being associated with one of the memory segment address binary levels. Each multiplexer has four inputs relating to the counter to which the input is connected. The first or A input of each of the multiplexers is connected to one of the four binary outputs of the 1's counter. That is, the first binary level from the 1's counter 75 is connected to the A input of the "32" level multiplexer 61 and the second binary level B from the 1's counter 75 is connected to the A input of the "64" multiplexer. The third and fourth outputs of the 1's counter 75 are connected to the "128" and "256" multiplexers 141 and 137. The 10's and 100's counters 73 and 71 are similarly connected to the multiplexers 137, 141, 143 and 145. With respect to the remaining inputs of the multiplexers 137, 141, 143 and 145, the fourth or D input of the "32" multiplexer 137 is connected to the output of the thousand's flip-flop 85 and the D input of the "64" multiplexer 141 is connected to system ground. As illustrated, the D inputs of the "128" and "256" multiplexers 143 and 145 are commonly connected to one terminal of a pull-up resistor 147 and to the fixed contact 151 of a single pole single throw switch 153 the movable contact of which is grounded. By positioning the switch 153 the user may either hold high or ground, the thousands or D inputs of the "128" and "256" multiplexers 143 and 145 thus manually selecting that portion of the memory which will be addressed by the thousands flip-flop 85. As will be subsequently further described, in connection with the construction of the memory, the switch 153 allows the operator to manually select either the generation of a plain number or a leading zero number. If desired, the displays may include a selective ripple blanking feature well known in the art and the display blanking of leading zeros conveniently ganged with the leading zero switch 153.

Serving to concurrently, sequentially advance each of the multiplexers 137, 141, 143 and 145 through their four positions is a multiplexer counter 155 having two binary level outputs 157 and 161 and thus four output states. The outputs 157 and 161 of the counter are fed to the address inputs of the multiplexers 137, 141, 143 and 145 via lines 163 and 165. The counter 155 is advanced by the falling edge of a shift signal generated by the memory 17 and fed to the clock input 167 of the counter 155 through a NOR-gate 171. A suitable NOR-gate 171 which interfaces with the output of the memory 17 is of the Unilogic series by Signetics Corporation and designated SP380A. As previously mentioned, each of the memory 17 segments (FIG. 2) selected by the multiplexer 137, 141, 143 and 145 contain one encoded digit in some of the thirty two bit locations available in each segment. Serving to sequentially address each of these bit locations and thus generate the code digit stored in the addressed segment is the four level binary counter 63. The four levels and complements of the counter 63 address the memory 17 and are designated with their binary values "1", "2", "4", "8", "16" and complement. As will be subsequently further described, each time the switching means 61 addresses a new segment of the memory 17, the counter 63 is advanced by the output of a clock 173 thereby sequentially addressing each of the selected memory segment bit locations until the selected digit has been generated at which time the counter 63 resets and the multiplexers 137, 141, 143 and 145 switch to the next lower significant digit of the selected number and the counter 63 recycles.

MEMORY

The illustrated embodiment includes a diode matrix memory; however, it should be appreciated that other memory devices may be used without departing from the spirit of this invention. To facilitate understanding, the memory 17 may be considered as comprising sixteen 32 bit segments (FIG. 2) each including a code section parallely addressed with at least one digit completion section. The code section of a selected memory segment generates the Morse code digit provided at memory output 65 and the digit completion section generates at least one digit completion or shift signals at output 175 which is fed to the control means 67 as will be subsequently further considered. As illustrated in FIG. 2, eleven of the sixteen segments serve to generate one encoded digit with the digit "1" one repeated. The twelfth segment 45 designated "space" generates a continuous space code as will hereinafter be described and the remaining four segments 41, 43, 55 and 57 are not addressed by the switching means 61. For example, when segment 33 is addressed and the binary counter 63 advances, the code segment generates the Morse code equivalent of the digit "7". Upon completion of the generation of the digit "7", the digit completion section of the memory generates a shift pulse at the output 175 which is fed to the control means 67. The diodes comprising the memory 17 are selected by Karnaugh mapping techniques, well known to those skilled in the art. One such Karnough map decoding scheme for the code section of the memory is illustrated in the following Table I. Each of the diode groups in Table I are diode OR connected to the code output 65 of the memory 17.

TABLE I

| GROUP | DIODE LOCATIONS |
|---|---|
| A | $\overline{2}$ , $\overline{4}$ , $\overline{8}$ , $\overline{16}$ |
| B | $\overline{1}$ , 2, $\overline{32}$ |
| C | $\overline{1}$ , 2, $\overline{128}$ , 256 |
| D | $\overline{1}$ , 16, $\overline{32}$ , 256 |
| E | $\overline{1}$ , $\overline{2}$ , 32, $\overline{128}$ , $\overline{256}$ |
| F | $\overline{1}$ , 2, $\overline{4}$ , $\overline{8}$ , $\overline{16}$ |

TABLE I-continued

| GROUP | DIODE LOCATIONS |
|---|---|
| G | $\overline{1}$, $\overline{8}$, $\overline{16}$, 64, $\overline{128}$ |
| H | $\overline{1}$, 2, 128, $\overline{256}$ |
| I | $\overline{1}$, $\overline{2}$, 4, 8, 64, 128 |
| J | $\overline{1}$, $\overline{4}$, $\overline{32}$, 128 |
| K | $\overline{1}$, $\overline{8}$, $\overline{64}$, 128, $\overline{256}$ |
| L | $\overline{1}$, $\overline{2}$, 32, $\overline{64}$, 128 |

A Karnaugh map decoding scheme for the digit completion section of the memory 17 is illustrated in the following Table II. Each of the diode groups are diode OR connected to the shift output 175 of the memory 17.

TABLE II

| GROUP | DIODE LOCATIONS |
|---|---|
| M | 16, 32, 64 |
| N | 2, 4, 8, $\overline{32}$, 128 |
| O | 4, 16, 32 |
| P | 2, 16, $\overline{32}$, 256 |
| Q | 2, 16, 64 |
| R | 4, 8, 32, $\overline{64}$, 128, $\overline{256}$ |
| S | 2, 4, 16 |
| T | 0, 1, $\overline{32}$, $\overline{64}$, $\overline{128}$, $\overline{256}$ |
| U | 2, 4, 8, $\overline{32}$, $\overline{64}$, $\overline{128}$, $\overline{256}$ |
| V | 1, 2, $\overline{32}$, $\overline{64}$, 128, 256 |
| W | 8, 32, $\overline{128}$, 256 |

With reference to FIG. 3 at 177, the generation of the digit "1" is illustrated. Either of the memory segments 23 or 47 generate the digit "1". The switching means 61 will provide high address inputs at either the memory segment address combination "32-64-128-256" or "32-$\overline{64}$-128-256". The latter combination is selected when the leading zone delete switch 153 is closed and the multiplexers 137, 141, 143 and 145 of the switching means 61 are in the D or thousands position, that is, when the output of the thousands flip-flop 85 is high and is connected to the memory 17 input through the multiplexer 137. As the binary counter 63 advances, the code output 65 of the matrix first goes low at bit three (FIG. 3-177) and the following counts of the counter 63 illustrate the generation of the digit "1". It should be appreciated that the first dot in the generation of the digit "1" is preceded by a three bit space which provides the inter-digit spacing for the selected number. Normally the inter-digit spacing of a number is understood to follow a digit; however, for reasons which will be subsequently more fully appreciated, the inter-digit space is placed before the related digit. At the start of the twentieth bit a shift signal 181 at the memory output 175 goes momentarily high which level is fed through the NOR-gate 171 of the control means 67 resetting the binary counter 63 and advancing the multiplexer counter 155 so as to advance the multiplexers 137, 141, 143 and 145 to the next digit position thereby connecting the binary output of the next lesser significant BCD counter to the segment address input 135 of the memory 17. The digits "2", "3", "4", "5", "6", "7", and "8" are generated in a similar manner.

With respect to the generation of the digit 9 illustrated at 183 of FIG. 3, the code section (Table I) of the memory 17, after the completion of three inter-digit spacing bits, generates four dashes and a dot. The segment 53 of the memory is capable of generating two shift signals 185 and 187. A shift signal 185 is generated at the start of the twentieth count of the binary counter 63 terminating the code generation of the digit "9". Additionally, a selectively actuable diode group indicated as Group W in Table II and schematically illustrated at 191 in FIG. 4 includes diodes 193, 195, 197, and 201 at positions "8, 32, $\overline{128}$, 256" and generates a shift signal 187 at the start of the eighth count of the binary counter 63. The diode Group W additionally includes a pull up resistor 203 and a diode 205 coupling the diode Group W to the shift output 175 of the memory 17. Termination of the generation of the digit "9" at count eight results in the generation of a dash and a dot which is the Morse code equivalent of the letter "N". It will be appreciated that when Group W is enabled, this group will generate a shift signal before the entire digit "9" has been generated and, thus, each time memory segment 53 is addressed by the switching means 61 a short "9" or "N" will be generated. Serving to disable diode group W is a switch 207. When switch 207 is closed, the Morse code numberal "9" will be generated. Thus, the operator is provided with a convenient means for selecting the generation of a short "9", that is, an "N" or the conventional Morse code digit when such digit appears as part of the selected number.

At 211 of FIG. 3 is illustrated the generation of the numeral "φ" which comprises five dashes preceded by a three bit inter-digit space. This digit is generated when segment 21 of the memory is addressed by the switching means 61. Diode group S of Table II generates a shift pulse at the end of the fifth dash as illustrated at 213 thereby terminating the generation of the digit. As previously mentioned, the illustrated embodiment includes means for generating an abbreviated "φ", that is, the letter "0". Diode group U of Table II generates a shift signal at the end of the third dash illustrated at 215 of FIG. 3 and is selectively enabled by the switch 217 (FIG. 1) in a manner similar to that previously discussed in connection with the abbreviation of the numeral "9" to the letter "N".

When segment 45 of the memory 17 designated "space" is addressed, the code output 65 of the memory 17 remains high as illustrated at 221 of FIG. 3 until a shift pulse 223 is generated at the start of count 3 of the binary counter for purpose to be subsequently further considered. Thus, all φ's in the thousands level of the selected number are always deleted whether a plain or leading zero number is selected. In this manner, preselected numbers below one thousand are always limited to the generation of three encoded digits.

CONTROL MEANS

Serving to provide the operator with a convenient means for initiating the generation of the selected number is an advance-initiate pushbutton switch 225 one terminal of which is connected to ground and the remaining terminal of which is connected to the cathode of a steering diode 227, a pull-up resistor 231 and to the clear input 233 of a type D serial advance flip-flop 235. The output of the flip-flop 235 is fed to the clock input via line 237 of the lowest significant digit counter 75 so that when the switch is depressed clearing the flip-flop the $\overline{Q}$ output goes high, advancing the counter 75. The anode of the steering diode 227 is connected to one terminal of a number initiate pushbutton switch 241, a pull-up resistor 243 and the clear input 245 of a switch lock-out type D flip-flop 247. The $\overline{Q}$ output of the flip-flop 247 is connected to the clear input of the multiplexer counter 155 and the Q output is fed to one input of the NOR-gate 171 the output of which resets the binary counter 63.

The toggle or clock inputs of the flip-flops 235 and 247 are commonly connected to the binary "2" level output of the multiplexer counter 155 via line 165. Thus, as the counter 155 goes through its four states the binary "2" level goes low after the fourth state following the multiplexer position which switches the least significant counter 75 to the memory 17 address. This falling signal edge sets both of the flip-flops 235 and 247. The Q output of the flip-flop 247 goes high and the $\overline{Q}$ output thereof low holding the counter 155. The Q output of the flip-flop 247 forces the NOR-gate 171 output low holding the binary counter 63. This set condition of the flip-flops 235 and 247 is the rest condition of the generator 11.

Due to the isolating action of the steering diode 227, actuation of the code initiate switch 241 clears flip-flop 247 but not the flip-flop 235. The clearing of the flip-flop 247 allows both the counter 155 and the binary counter 63 to advance and the Morse code generation of the number stored in the number selection unit 13 is available at the code output 65 of the memory 14. After all of the BCD counters 71, 73 and 75 and flip-flop 85 have sequentially addressed the memory, the multiplexer counter 155 generates a falling edge again setting the flip-flop 247 returning the generator 11 to its rest state. It will be appreciated that depression of the switch 241 while a selected number is being generated will not reset the counters 155 or 63; thus, an initiate switch 241 lock out feature is provided. In summary, actuation of the switch 225 resets both flip-flops 235 and 247 and the output of the number advance flip-flop 235 goes high advancing the lowest significant digit counter 75. Further, reset of the flip-flop 247 allows both the binary counter 63 and multiplexer counter 155 to advance. In response to actuation of switch 241, the Morse code equivalent of the number displayed by the display unit 15 and stored in the number selection unit 13 is generated.

The control means 67 additionally includes a zero deletion R.S. type flip-flop 251 the set input 253 of which is connected to the Q output of the generator control flip-flop 247 and the reset input 255 of the flip-flop is controlled by the binary "2" output of the binary counter 63 via line 257. A high signal at the set input will bring the flip-flop 251 output high which will remain high until the reset input goes high with the set input low. Thus, the flip-flop 251 output will be high when the generator 11 is in its rest condition and will go low after actuation of either of the switches 225 or 241 and after the binary counter 63 has reached its third state with the binary "2" output thereof high. With reference to FIG. 2 and Table II when the "φ" memory segment 21 is addressed, diode group T illustrated at 259 in FIG. 4 generates a "φ" delete shift pulse at the start of the second count of the binary counter which occurs with the output of the flip-flop 251 high. Group T includes diodes 261, 263, 265, 267 and 271 connected between the common terminal of a pull up resistor 273 and selected binary levels of the memory 17 segment bit location address inputs. Further, the cathodes of the diodes are OR-gated through a diode 275 to the shift output 175 of the memory 17. The generation of the "φ" delete shift pulse by diode group T is dependent upon the level of the Q output of the R.S. flip-flop 251 which is connected via line 277 to the cathode of a diode 281, the anode of which is connected to the common anodes of the diodes 261-271. Thus, when the first segment addressed by the switching means during the Morse code generation of a number is the "φ" digit segment 21, a momentary shift pulse will be generated by the diode group T on the second count of the binary counter illustrated at 283 (FIG. 3) resetting the binary counter 63, advancing the counter 55 and switching the multiplexers 137, 141, 143 and 145 to the next most significant digit of the number in the unit 13. Should the next significant figure also address the "φ" memory segment 21, the counter will again be shifted on the second count of the binary counter. During this period, the code output of the memory is high, since as previously mentioned, the memory segments are arranged to generate an inter-digit space before generation of the encoded digit. This condition will repeat until one of the remaining memory segments are addressed by the switching means. None of the other addressable memory segments generates a switching pulse until at least the third count of the binary counter 63. When an addressable memory segment other than the segment "φ" is addressed, the R.S. flip-flip 251 will reset on the third count of the binary counter 63, corresponding to a high at level "2", with the flip-flop output going low effectively removing the "φ" delete shift pulse of Group T from memory. Thereafter, during the generating of the remaining digits of the selected number, when the "φ" memory segment 21 is addressed, a full zero or abbreviated Morse code zero will be generated. In this manner, the code generation of leading zeros in the selected number is deleted.

OPERATION

The operation of the illustrated embodiment is best appreciated by considering the manner in which exemplary numbers are generated. For discussional purposes, it will be assumed that the number "009" is to be generated with leading zeros deleted that is the plain number "9". The operator sets BCD switch 93 to read "9" and the remaining BCD switches 87 and 91 to "φ". The switch 115 is momentarily depressed to the right (FIG. 1) grounding contact 119 which pulls the clear input 121 of the thousands flip-flop 85 and the load inputs 95, 97, and 101 of the counters 71, 73, and 75 low thereby loading the counters with the binary equivalent of the decimal number "009" set in the switches 87, 91 and 93. The display means will then display the preselected number "0009" having four significant digits. The zero deletion switch is placed into the open position shown in FIG. 1 which places a high signal at the D inputs of the "128" and "256" multiplexers 143 and 145. As previously mentioned, when the generator 11 is at rest, the output $\overline{Q}$ of the counter advance flip-flop 235 is low as is the $\overline{Q}$ output of the generator initiate flip-flop 247. The high level of the Q output of the flip-flop 247 is inverted by the NOR-gate 171 placing a low at the reset input of the binary counter 63 holding the counter. Additionally, the Q output of the R.S. flip-flop 251 will also be high being held in this state by the high Q output of the flip-flop 247.

Momentary depression of the message initiate switch 241 causes the initiate flip-flop 247 to clear and thus the clear input to the multiplexer counter goes high as well as the output of the NOR-gate 171. The output of the counter 155 addresses the multiplexers 137, 141, 143 and 145 to their D position which corresponds to the most significant or thousands level of the number. Since the thousands flip-flop 85 output is low, the $\overline{32}$ input to the memory will be high as well as the $\overline{64}$, $\overline{128}$, $\overline{256}$ inputs thereby addressing the segment 21 of the memory 17. Advancing in response to the clock 173 pulses, the counter 63 steps one position until the output of Diode Group T 261, which generates the zero delete shift pulse, goes high generating a momentary pulse 283 which passes through the NOR-gate 171 resetting the binary counter 63 and advancing the counter 155. The C input of the multiplexers are now switched to the outputs of the hundreds counter 71 and the memory segment 21 is addressed. Similarly, the binary counter 63 advances one count and Diode Group T again generates a shift pulse. This second shift pulse advances the counter 155 and the multiplexers switch to the B or 10's position and again a "$\phi$" delete shift pulse is generated. Thus far, the multiplexers 137, 141, 143 and 145 have advanced through the three most significant digits of the selected number without the code output 65 of the memory 17 having gone low. The counter 155 is now in its fourth state with the A inputs of the multiplexers addressing the memory. In this position, segment 53 of the memory is addressed and the binary counter 63 steps through 20 counts generating the Morse code equivalent of the numeral "9" as at 183. Should the operator desire to generate a short "9" or the letter "N", the switch 207 will be opened and the binary counter will advance to count 8 before the generation of a shift pulse. The "9" or "N" abbreviated digit pulses 185, 187 are present at the memory shift pulse output 175 and pass through the NOR-gate 171 resetting the binary counter 63 and advancing the multiplexer counter 155 to its first state. As the counter advances to its rest position, binary level "2" of counter 155 will go low toggeling the initiate flip-flop 247, the output Q of which goes high, resetting and holding the binary counter 63.

In response to depression of the message advance-initiate switch 225, the flip-flop 235 is cleared and the $\overline{Q}$ output thereof goes high advancing the counters 71, 73 and 75 to display "0010". Similarly flip-flop 247 is cleared allowing the counters 63 and 155 to advance. The thousands digit flip-flop 85 which indicates a zero digit, addresses the memory to segment 21 and the binary counter 63 advances one position generating a "$\phi$" delete shift pulse in the manner previously described. Thereafter, a zero delete shift pulse 283 is also generated when the hundreds counter 71 is switches to the memory. The B position of the multiplexers 137, 141, 143 and 145 results in the tens counter 73 addressing segment 23 which contains the code digit "1" which is subsequently completely generated. In response to the second count of the binary counter 63, during the generation of the code digit "1", the binary level "2" output of the binary counter 63 goes high and the R.S. flip-flop 251 changes state with the output thereof going low disabling the zero delete Diode Group T 261. The counter 155 thereafter switches the multiplexers to position A addressing memory segment 21. A completely formed Morse code zero is generated since Group T 261 which generates the "$\phi$" delete shift pulse 283 has been disabled. Thus, the two most significant leading zeros of the number "0010" have been deleted resulting in the generation of the plain number "10." Should the operator desire to send a leading zero number ("010"), the zero delete switch 153 is opened, placing a high at the thousand inputs to the "128" and "256" multiplexers 143 and 145. To initiate the generation of this number, the code initiate switch 241 is depressed allowing the binary counter 63 to advance in response to the clock 173. The multiplexers 137, 141, 143 and 145 place high signals at inputs "$\overline{32}$, $\overline{64}$, 128 and 256" of the memory thereby addressing segment 45 thereof. As the binary counter 63 advances, the code output is held high generating a continuous code space 221 as previously mentioned. On the second count of the counter 63 the binary "2" output goes high, and the R.S. flip-flop is reset, disabling Group T 261 and at binary count three, a shift pulse 223 is generated, resetting the counter 63 and advancing the multiplexers 137, 141, 143 and 145 to the hundred position C. The output of the hundreds counter 71 is fed through the multiplexers addressing memory segment 21 and a full Morse numeral "$\phi$" is generated; the zero delete pulse of Group T 261 having been disabled during the generation of the continuous space contained in segment 45. The tens and ones digits of the number are generated in the manner previously described. Should the operator desire to abbreviate the "$\phi$" in the number to the letter "O", the abbreviated zero switch 217 is opened enabling diode Group U and an abbreviated "$\phi$" shift pulse 215 is generated when segment 21 is addressed at count 12 rather than count 20 of the binary counter 63.

To complete the description, it will be assumed that the operator desires to generate the number "1100". The hundreds, tens and units switches 87, 91 and 93 are set to "100" and the counters 71, 73 and 75 loaded by momentarily grounding the fixed contact 113 of the switch presetting the flip-flop 85 and the display unit 15 presents the number "1100". The operator thereafter depresses the message initiate switch 241. With the multiplexers 137, 141, 143 and 145 addressed to then first position D, (thousands position), the multiplexer outputs address either memory segment 23 or memory segment 47 depending upon the position of the zero delete switch 153. With the zero delete switch in the open position, that is, the leading zero delete position, memory segment 47 is addressed and in the alternate position segment 23 is addressed. In either case, as the binary counter advances and the Morse digit "1" at 177 is generated and a shift pulse 181 at bit 20 advances the counter 155 and the binary counter 63 is reset. The Morse code equivalent of the remaining numerals are generated in a manner similar to that previously described.

An International Morse Code generator has been described which allows the operator to preset and display the selected number and selectively initiate the generation of its Morse code equivalent. The numerically successive number can be generated by actuation of a message advance-initiate switch 225. Further, the user is afforded the option of selecting a plain or leading zero number and selectively abbreviating certain digits comprising the number being generated.

Although the invention has been particularly shown and described with reference to a preferred embodiment thereof, it will be understood that various changes in form and detail may be made without departing from the spirit and scope of the invention.

What is claimed is:

1. An apparatus for generating an encoded selected number having a plurality of significant digits comprising:
   means for serially generating an encoded most significant digit of the number and subsequently serially generating encoded progressively lesser significant digits of the number;
   said serial generating means including a selectively addressable memory having a plurality of exclusively addressable segments each containing an encoded digit, each of said segments having a plurality of individually addressable bit locations;
   means for sequentially addressing those memory segments which correspond to the digits of the number;
   means for sequentially addressing the bit locations of the addressed memory segment, and means responsive to the generation of an encoded digit for resetting said bit location address means and for advancing said segment address means to the address of a next lesser significant digit of the selected number whereby the selected number is translated into a serially generated code;
   means for storing the selected number;
   means for inhibiting the advance of said bit location address means and said segment address means upon the completion of the generation of the least significant digit of the selected number; and
   means for changing the number within said storage means to the next sequential number and for disabling said inhibiting means thereby initiating generation of said next sequential number.

2. The apparatus of claim 1 which includes means related to each of said segments for providing a shift signal indicating the completion of the generation of the digit contained in the corresponding memory segment and wherein one of said segments contains an encoded zero digit; and means related to said memory segment containing an encoded zero digit for providing a zero delete shift signal; said zero delete shift signal being generated before the generation of an encoded zero thereby preventing the generation of an encoded zero digit by said zero digit segment.

3. An apparatus for generating an encoded selected number having a plurality of significant digits comprising:
   means for serially generating an encoded most significant digit of the number and subsequently serially generating encoded progressively lesser significant digits of the number;
   said serial generating means including a selectively addressable memory having a plurality of exclusively addressable segments each containing an encoded digit, each of said segments having a plurality of individually addressable bit locations;
   means for sequentially addressing those memory segments which correspond to the digits of the number;
   means for sequentially addressing the bit locations of the addressed memory segment, and means responsive to the generation of an encoded digit for resetting said bit location address means and for advancing said segment address means to the address of a next lesser significant digit of the selected number whereby the selected number is translated into a serially generated code;
   means related to each of said segments for providing a digit completion signal indicating the completion of the generation of the digits contained in the corresponding memory segment;
   each of said memory segments generates an interdigit code space prior to the generation of the digit encoded therein and wherein one of said segments contains an encoded zero digit; and
   means related to said memory segment containing an encoded zero digit for providing a zero delete signal generated during the space code generated by said zero digit memory segment thereby deleting the generation of an encoded zero digit by said zero digit memory segment.

4. The apparatus of claim 3 including means for storing the selected number, means for inhibiting the advance of said location address means and said segment address means upon the completion of the generation of the least significant digit of the selected number and means for changing the number within said storage means to the next sequential number and for disabling said inhibiting means thereby initiating generation of said next sequential number.

5. The apparatus of claim 4 which includes means related to a selected segment for generating an abbreviated digit completion signal prior to the complete generation of the digit encoded in the selected segment so that an abbreviated encoded digit is generated and means for selectively inhibiting said abbreviated digit completion means to permit selective generation of a fully encoded digit.

6. The apparatus of claim 5 wherein said storing means includes a plurality of manually presettable counters and said segment address means includes a switching means for sequentially switching the output of a selected one of said counters to address said memory whereby the encoded digit contained in the addressed segment corresponds to the digit manually loaded into the selected counter.

7. An apparatus for generating an encoded selected number having a plurality of significant digits comprising:
   means for serially generating the encoded most significant digit of the number and subsequentially serially generating the encoded progressively lesser significant digits of the number;
   means for deleting the serial generation of encoded leading zero digits preceding the most significant non-zero digit in the number;
   said serial generating means includes a memory having a plurality of segments with at least one segment containing each encoded digit and at least one of said segments contains a continuous space code;
   means for sequentially selecting those memory segments which correspond to the digits of the selected number;
   means responsive to the selection of a memory segment other than zero digit segment for disabling said zero digit deleting means whereby the encoded equivalent of the selected number is translated into a serially generated code with leading zero digits being deleted; and
   means for selectively addressing said space code segment when the first significant digit of the number is zero thereby generating one less significant digit than the total number of digits in the selected number.

8. An apparatus for generating an encoded selected number having a plurality of significant digits comprising:

means for serially generating the encoded most significant digit of the number and subsequentially serially generating the encoded progressively lesser significant digits of the number;

means for deleting the serial generating of encoded leading zero digits preceding the most significant non-zero digit in the number;

said serial generating means includes a memory having a plurality of segments with at least one segment containing each encoded digit and each segment includes a plurality of bit locations;

means for sequentially selecting those memory segments which correspond to the digits of the selected number;

means responsive to the selection of a memory segment other than the zero digit segment for disabling said zero digit deleting means thereby the encoded equivalent of the selected number is translated into a serially generated code with leading zero digits being deleted; and a counter for sequentially addressing the bit locations of a selected memory segment, said zero delete signal disabling means being responsive to the address of said bit location counter.

9. The apparatus of claim 8 wherein at least one of said segments contains a continuous space code and means for selectively addressing said space code segment when the first significant digit of the number is zero thereby generating one less significant digit than the total number of digits in the selected number.

10. The apparatus of claim 9 wherein said zero delete disabling means includes a flip-flop which is placed in a first state upon the initiation of the generation of the selected number and placed to a second state when said location counter reaches a predetermined count, the output of said flip-flop serving to disable said zero delete disabling means.

11. The apparatus of claim 10 which includes means related to each of said segments for providing a signal indicating the completion of the generation of the digit contained in the corresponding memory segment.

12. The apparatus of claim 11 which includes means related to a selected segment for generating an abbreviated digit completion signal prior to the complete generation of the digit encoded in the selected segment so that an abbreviated encoded digit is generated and means for selectively inhibiting said abbreviated digit completion means to permit selective generation of a fully encoded digit.

13. An apparatus for generating an encoded selected number having a plurality of significant digits comprising:

means for serially generating a Morse encoded significant digit of the selected number and subsequentially serially generating Morse encoded progressively lesser significant digits of the number said serial generating means including a selectively addressable memory having a plurality of exclusively addressable segments each having a plurality of individually addressable bit locations, each of said segments containing a complete Morse encoded digit;

means for sequentially addressing those memory segments which correspond to the digits of the selected number; and selectively operable means for abbreviating the Morse code equivalent of the digit contained in at least one of said memory segments to that the segment will generate an abbreviated digit when addressed.

14. The apparatus of claim 13 which includes means related to each of said segments for providing a signal indicating the completion of the generation of the fully encoded digit contained in the corresponding memory segment; and wherein said abbreviating means including means related to a preselected segment for generating an abbreviated digit signal prior to the generation of said completion signal of the corresponding memory segment thereby prematurely terminating the generation of the fully encoded digit by the selected memory segment thus generating an abbreviated Morse digit.

15. The apparatus of claim 14 wherein said abbreviated digit signal means includes a diode matrix and includes means for selectively enabling said diode matrix so as to permit generation of said digit completion signal after full generation of the related encoded digit.

16. The apparatus of claim 14 which further includes means for deleting the generation of encoded leading zeros preceding the most significant non-zero digits in the number whereby the generation of the number commences with the generation of an encoded digit greater than zero.

17. The apparatus of claim 16 wherein at least one of said segments contains a continuous space code and means for selectively addressing said space code segment when the first significant digit of the number is zero thereby generating one less significant digit than the total number of digits in the selected number.

* * * * *